Oct. 11, 1927.
J. HOPKINSON
1,645,326
WEIGHING SCALE
Filed Feb. 17, 1926
2 Sheets-Sheet 1
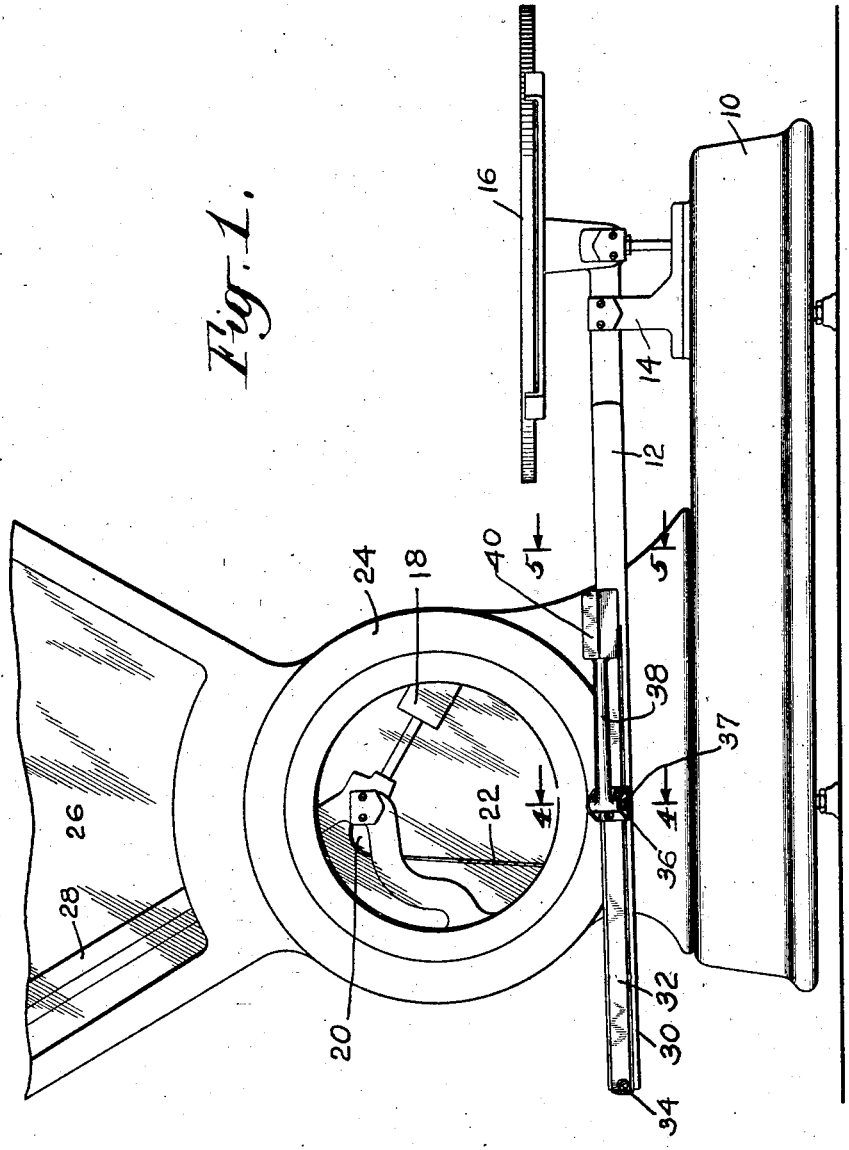
Inventor
Joseph Hopkinson
By his Attorneys
Cooper, Kerr & Dunham Oct. 11, 1927.
J. HOPKINSON
1,645,326
WEIGHING SCALE
Filed Feb. 17, 1926    2 Sheets-Sheet 2
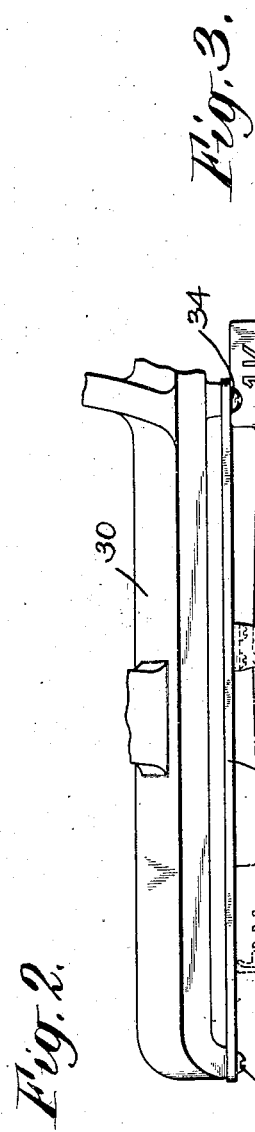
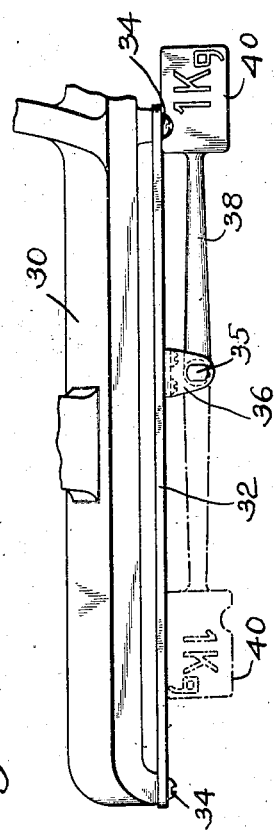
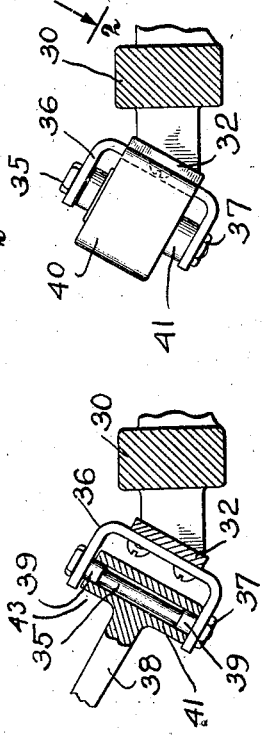
Inventor
Joseph W. Hopkinson
By his Attorneys
Cooper, Kerr & Dunham Patented Oct. 11, 1927.

1,645,326

UNITED STATES PATENT OFFICE.

JOSEPH HOPKINSON, OF DAYTON, OHIO, ASSIGNOR TO DAYTON SCALE COMPANY, OF DAYTON, OHIO, A CORPORATION OF NEW JERSEY.

WEIGHING SCALE.

Application filed February 17, 1926. Serial No. 88,740.

This invention pertains to automatic weighing scales of the type in which a variable counterbalance, such as a spring or pendulum, is used to counterbalance the load on the platform and cause the weight of the goods to be automatically indicated on a graduated chart. In using such a scale it sometimes happens that the operator wishes to weigh a load greater than the capacity of the automatic counterbalancing device. To meet such requirements scales of this type are sometimes provided with beams on which are mounted weights manually settable by the operator to increase the weighing capacity of the scale. While the settable weight is in normal position the capacity of the scale is represented by the chart alone. If a load beyond the capacity of the chart be encountered the settable weight is moved to a new position in which it is effective to counterbalance a portion of the load on the scale platform. Under such circumstances the operator must add the weight indicated by the capacity weight in its new position to the weight indicated by the chart in order to ascertain the true weight of the goods. In devices of this kind it is desirable when the capacity weight is shifted from normal (ineffective) position to effective position that the customer be advised of that fact by a suitable signal displayed on the customer's side of the machine.

In the present invention the capacity weight has two operative positions, in one of which the weight is effective, and in the other position ineffective. The ineffective position is the normal position.

If the settable weight has the same weighing capacity as the automatic chart the use of the capacity weight in operative position serves to double the weighing capacity of the scale, in which particular case the capacity weight is sometimes called a "doubling" weight.

It is essential that a capacity weight be either "all on" or "all off". Therefore it must be of such design that it cannot be stopped in any intermediate position.

My present invention covers an improved capacity weight of the above type.

In the drawings,

Fig. 1 shows a front view of an automatic scale with my invention attached.

Fig. 2 is a plan view of my device in the direction indicated by the arrows 2—2 in Fig. 5.

Fig. 3 is a fragmentary view of a portion of the scale and the capacity weight as viewed from the customer's side when the weight is "on".

Fig. 4 is a sectional view showing details of the pivotal support of the weight on line 4—4 of Fig. 1.

Fig. 5 is an end view of my device on line 5—5 of Fig. 1.

In Fig. 1, 10 is the scale base, 12 the scale lever pivoted on the fulcrum stand 14. 16 is the platform on which are placed the goods to be weighed, 18 is the pendulum connected by cam 20 and tape 22 to the end of lever 12 within the vertical housing 24. Housing 24 also encloses the chart 26 and indicator 28 which swings across the chart to indicate weight, or weights and values. In the scale illustrated 12 is a lever of the first order. Therefore pendulum 18 falls as the platform load increases.

Mounted on an extension 30 of lever 12 is a tare beam 32 fastened to extension 30 by screws 34. Tare beam 32 is so located in front of housing 24 that its outer end projects well beyond the side of housing 24 away from the platform, but the inner end of the tare beam projects little, if any, distance beyond the platform side of the housing.

It is customary in the weighing scale art to place the tare beam with its face in a vertical plane, but for the purpose of my invention the beam 32 is inclined with its upper edge considerably closer to the scale housing than its lower edge.

Fast to the tare beam near its center is the curved bracket 36 on which is pivotally mounted the arm 38 of the capacity weight 40. The pivotal support for arm 38 comprises a stem 35 which passes through the upper arm of bracket 36 and is fastened to the lower arm of bracket 36 by clamping the arm between nut 37 and a shoulder on stem 35. Stem 35 is provided at its upper and lower ends with enlarged portions 39 which provide bearings for the boss 41 of arm 38.

In operation, the force of gravity keeps boss 41 in constant contact with the lower arm of bracket 36. There is some clearance, as shown, between the upper arm of bracket 36 and head 43 of stem 35, thus obviating any possibility of deforming bracket 36 by means of stem 35. The construction just described insures that capacity weight 40 is maintained in service in proper operative relationship to the other working parts of the scale, thereby insuring accuracy of performance. Capacity weight 40 is shown in normal position in Fig. 1 and in the full lines of Fig. 3. While the weight is in normal position the weighing capacity of the scale is represented by the capacity of the graduated chart. To increase the capacity of the scale the operator swings weight 40 to its effective position at the other end of beam 32, as shown in Fig. 5 and as indicated by the dotted outline in Fig. 3.

In the scale in the drawings it is assumed that the weighing capacity of the weight 40 is 1 kg., which means that when the weight is in effective position the weighing capacity of the scale is increased by 1 kg., and therefore 1 kg. must be added to the weight indicated on the chart in order to know the weight of goods on the scale platform. In normal (ineffective) position doubling weight 40 is concealed from the customer by upright housing 24, but while in effective position the weight is on the other end of beam 32 and is visible to the customer as shown in Fig. 3. The weight is inscribed with characters representing its capacity (in the present case 1 kg.), and the inscription is so located on weight 40 as to be in position to be read by the customer when the doubling weight is in its effective position (Fig. 3), thus informing him of the true weighing capacity of the scale.

It has been customary in previous doubling weights of this kind to mount them with the axis of the doubling weight stem horizontal, so when the doubling weight was moved from one position to the other it would swing in a vertical plane. Very often the operator, in his haste, does not lower the weight carefully to position but lets it drop vertically. The capacity weight often has considerable mass and its operation in that manner causes very injurious shocks throughout the scale mechanism, thereby calling for frequent adjustments, and reducing the life of the machine.

My present design overcomes that difficulty and obviates the necessity for bumper springs which are sometimes used to lessen the shock of the vertically dropping doubling weights in previous designs. My capacity weight 40 swings in an inclined instead of vertical plane, thereby greatly reducing the impact of the weight on the beam if the weight is released carelessly by the operator. In practice the axis of my weight is more nearly vertical than horizontal, being inclined from the vertical sufficiently so that the capacity weight will remain in fixed contact with the beam in either of its positions, and being inclined towards the horizontal sufficiently so there is no possibility of the weight inadvertently sticking in any intermediate position out of contact with the beam to which it is attached. The position of weight 40 provides a naturally inclined surface for the inscription of its weight at an angle most advantageous for an easy reading by the customer.

Thus it will be seen that my invention provides an improved device, positive in operation, non-injurious to the scale mechanism, and easily readable by the customer. The fact that the capacity weight swings in an inclined plane reduces the vertical component of its mass so that if the weight be carelessly handled there will not be much resulting shock on the other parts of the scale, while still retaining enough of the vertical component to retain the weight securely in operative position.

I claim—

1. In combination with an automatic weighing scale having a tare beam, a settable capacity weight on said beam, said weight having effective and non-effective operative positions, and being pivotally mounted to swing from one operative position to the other in an inclined plane.

2. The invention set forth in claim 1 in which the vertical component of the capacity weight is utilized to retain said weight in operative position.

3. The invention set forth in claim 1 in which said capacity weight is provided with an inscription designating its weight, said inscription being readable from the reverse side of the scale whenever said capacity weight is in effective position.

4. The invention set forth in claim 1 in which said capacity weight is pivotally supported in a non-adjustable position relatively to said tare beam.

5. An automatic weighing scale provided with a chart, and a tare beam having a settable capacity weight thereon which has effective and non-effective operative positions, characterized by the fact that the capacity weight is pivotally mounted on said beam to swing from one operative position to the other on an inclined axis.

In testimony whereof I hereto affix my signature.

JOSEPH HOPKINSON.